United States Patent
Day

(10) Patent No.: US 12,422,095 B1
(45) Date of Patent: Sep. 23, 2025

(54) SUSPENDED OIL DRIP PAN FOR A TOOL

(71) Applicant: Otis Day, Kearney, NE (US)

(72) Inventor: Otis Day, Kearney, NE (US)

( * ) Notice: Subject to any disclaimer, the term of this patent is extended or adjusted under 35 U.S.C. 154(b) by 277 days.

(21) Appl. No.: 17/869,033

(22) Filed: Jul. 20, 2022

(51) Int. Cl.
F16M 11/22 (2006.01)
F16N 31/00 (2006.01)

(52) U.S. Cl.
CPC ........... F16N 31/006 (2013.01); F16M 11/22 (2013.01)

(58) Field of Classification Search
CPC ........ F16N 30/02; F16N 30/006; F16M 11/22
USPC ................ 220/571, 573; 248/150, 166, 165; 184/106
See application file for complete search history.

(56) References Cited

U.S. PATENT DOCUMENTS

| 2,831,583 | A | * | 4/1958 | Wright | B25H 1/00 |
| | | | | | 108/115 |
| 3,099,356 | A | * | 7/1963 | Burnett | A47B 31/04 |
| | | | | | 108/177 |
| 3,249,954 | A | * | 5/1966 | Franckowiak | B23Q 11/0042 |
| | | | | | 141/369 |
| 3,918,542 | A | | 11/1975 | Murillo | |
| 4,880,248 | A | * | 11/1989 | Elmer | B62B 1/10 |
| | | | | | 280/47.35 |
| 4,923,052 | A | | 5/1990 | Englebert | |
| 5,427,202 | A | * | 6/1995 | Behring | F01M 11/0458 |
| | | | | | 141/98 |

* cited by examiner

Primary Examiner — Don M Anderson
Assistant Examiner — Elizabeth J Volz
(74) Attorney, Agent, or Firm — Sanchelima & Associates, P.A.; Jesus Sanchelima; Christian Sanchelima

(57) ABSTRACT

A suspended oil drip pan for a tool including a support assembly, a drip pan assembly and a holder assembly. The support assembly includes a portable support stand for tools. The drip assembly includes a pan. The pan has securing elements. The holder assembly includes holding elements. The holding elements are attached to a central portion of the support stand. The holding elements have openings. The pan is detachable to the holding elements by inserting the securing element in the openings of the holding elements. The pan can support the weight of an oiler and prevent dripping of oil from the support stand to the floor.

7 Claims, 3 Drawing Sheets

SUSPENDED OIL DRIP PAN FOR A TOOL

BACKGROUND OF THE INVENTION

1. Field of the Invention

The present invention relates to a suspended oil drip pan for a tool and, more particularly, to a suspended oil drip pan for a tool that allows to collect oil without spilling.

2. Description of the Related Art

Several designs for drip pans have been designed in the past. None of them, however, include an adjustable oil drip pan which can be easily detached to a chain vise or power threader.

Applicant believes that a related reference corresponds to U.S. Pat. No. 4,923,052 issued for a fluid-retention platform for mechanical fluids. Applicant believes that another related reference corresponds to U.S. Pat. No. 3,918,542 issued for an oil drip pan for use on the underside of a vehicle as an auxiliary pan for catching leaking or dripping oil. None of these references, however, teach of a suspended oil retention pan comprising a rigid rectangular tray having hooks or hangers mounted to the edges for hanging the tray from a tool support stand.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a suspended oil drip pan for a tool that includes securing elements to secure the drip pan to a support.

It is another object of this invention to provide a suspended oil drip pan for a tool that includes portable support for tools, the drip pan is detachable to help in portability of the support for tools.

It is still another object of the present invention to provide a suspended oil drip pan for a tool that includes holding members to prevent movement of the oiler which is placed on the drip pan.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
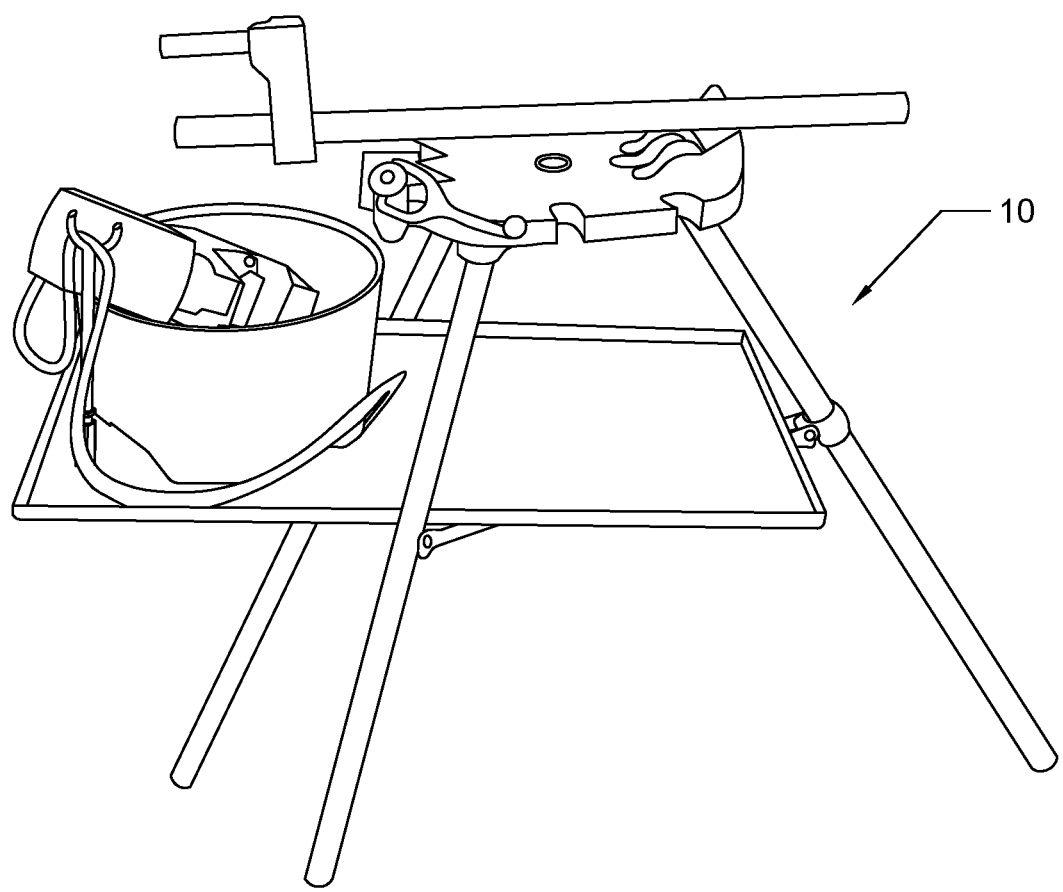
FIG. 1 represents an isometric operational view of the present invention 10.

Referring now to the drawings, where the present invention is generally referred to with numeral 10, it can be observed that it basically includes a supporting assembly 20, a drip pan assembly 40, and a holder assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The supporting assembly 20 may include legs 22 and a platform 24. In a preferred embodiment the legs 22 may be made of metal. It also may be suitable for the legs 22 to be made of plastic, wood, or any other resistant material. The legs 22 may have a cylindrical shape. It also may be suitable for the legs 22 to have a rectangular shape, a triangular shape, or any other suitable shape. The legs 22 may be 3 legs equidistantly disposed. It also may be suitable for legs 22 to include four legs, two legs, five legs and so on. The legs 22 may be diagonally attached to the platform 24. The legs 22 may be rotatably attached to the platform 24. The legs 22 may concentrically move beneath the platform 24 toward the center of the platform 24.

The platform 24 may be vertically disposed. In a preferred embodiment the platform 24 is perpendicularly disposed with respect to a surface having the legs supporting the weight of the platform 24. The platform 24 may be used to place and work with varied materials thereon. The platform 24 can support the weight of tools, pipelines, or any suitable good thereon. The supporting assembly 20 may preferably define a vise tripod. The platform 24 may have a circular shape. It also may be suitable for the platform 24 to have a rectangular shape, a triangular shape, or any other suitable shape. The platform 24 may be made of metal. It also may be suitable for the platform 24 to be made of plastic, wood, or any other suitable material. The pan assembly 40 may be attached to the supporting assembly 20 through the holder assembly 60. The pan assembly 40 may be used to avoid oil spilling while working on the platform 24 with tools that use oil. The pan assembly 40 may also be used to place additional tools while working over the platform 24.

The holder assembly 60 may include a holding element 62, hinges 66 and openings 68. The holding element 62 may be rotatably attached to the legs 22. The holding element 62 may include three triangular elements hingedly attached on to the other in a central triangular element. It also may be suitable for the holding element 62 to have a rectangular shape, a circular shape, or any other suitable shape. The holding element 62 may be retractable. The holding element 62 may be configured to be retracted making the legs 22 going toward the center. The holding element 62 may be made of metal. It also may be suitable for the holding element 62 to be made of plastic, wood, or any other suitable material. The holding element 62 may have openings 68. The openings 68 may transversely go from top to bottom through the holding element 62. Hinges 46 may be used for retractability of the holding element 62. Hinges 46 may be ball-bearing hinges, concealed hinges, butt hinges or any other hinges known in the prior art. The holder assembly 60 may support and hold the pan assembly 40.

The drip pan assembly 40 may include a layer 42, side retainers 44, holding elements 46, securing elements 48 and clips 48a. The layer 42 may have a rectangular shape. It also may be suitable for layer 42 to have a circular shape, a triangular shape, or any other suitable shape. The layer 42 may be made of metal. It also may be suitable for layer 42 to be made of plastic, wood, or any other suitable material. The layer 42 may have side retainers 44. The side retainers 44 may have a rectangular shape. The side retainers 44 may be made of metal, plastic, or any other suitable material. The side retainers 44 may extend perpendicularly upwards from the edges of the layer 42 defining a drip pan which is especially used for avoiding dripping of oil or any other liquid. In a preferred embodiment a user may be working over the platform 24 and the layer 42 may be located under the platform 24 to avoid dripping of oil or any other liquid to the floor. The retainer 44 may prevent the oil from spilling over the edges of the layer 42.

Figure 5:
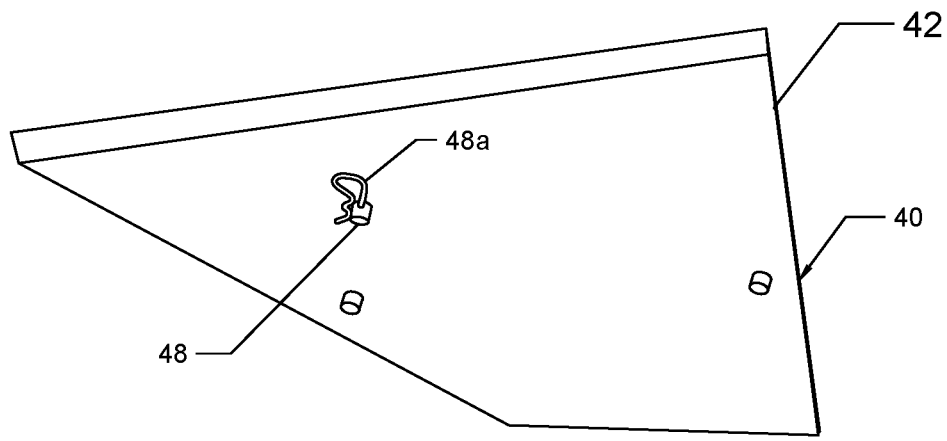
FIG. 5 is a representation of a bottom perspective view of the pan assembly 40.

The drip assembly 40 may be fixed to the holder assembly 60 by means of securing elements 46. The securing elements 46 may have a cylindrical shape. It also may be suitable for the securing elements 46 to have a rectangular shape, a triangular shape, or any other suitable shape. As best illustrated in FIG. 5 the securing elements 46 may be perpendicularly disposed in the bottom of the layer 42. The securing elements 46 may be adapted to fit in the openings 68. The securing elements 46 may have a hole. The clips 48a may be introduced through the hole of the securing element 48 to avoid the securing elements 46 from getting out of the openings 68.

Figure 2:
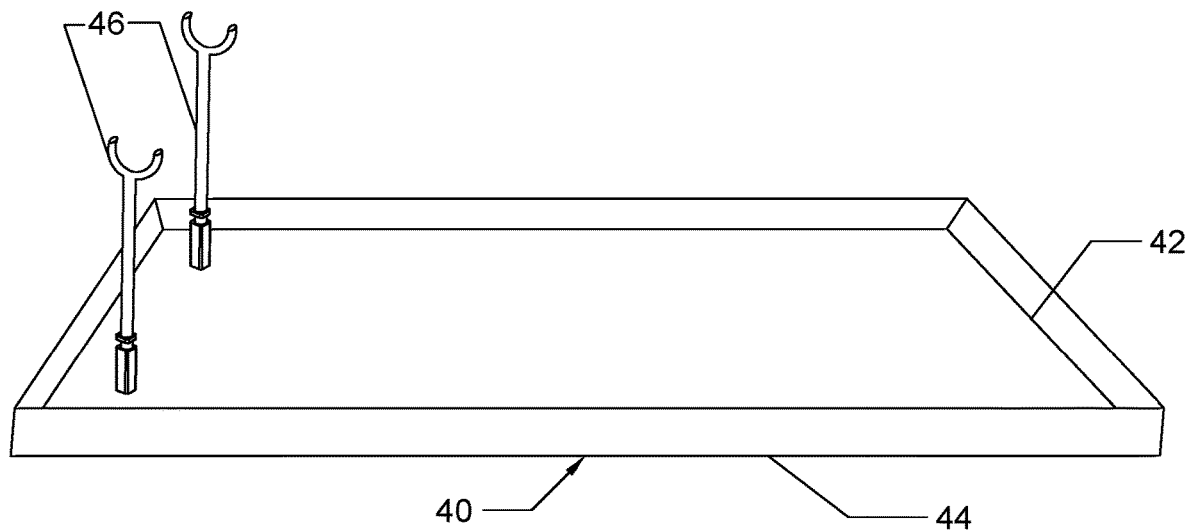
FIG. 2 is a representation of an isometric view of the drip pan assembly 40.
Figure 3:
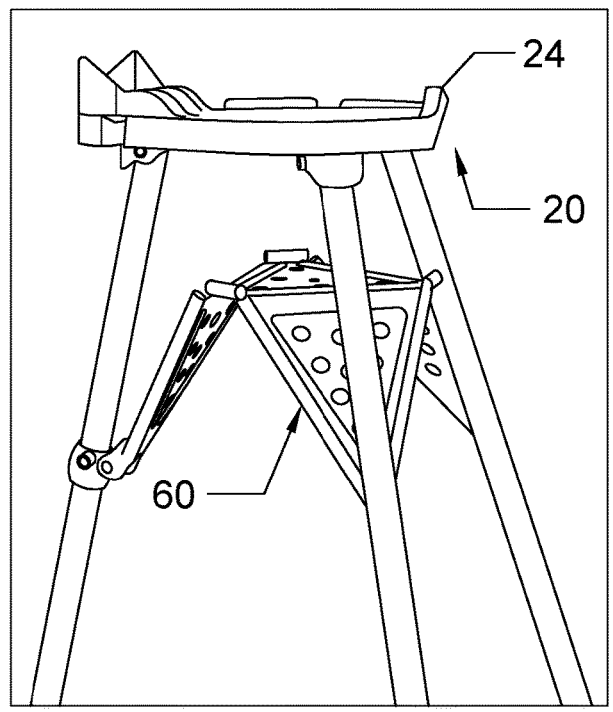
FIG. 3 shows an isometric view of the supporting assembly 20 and the holder assembly 60 in a closed configuration.
Figure 4:
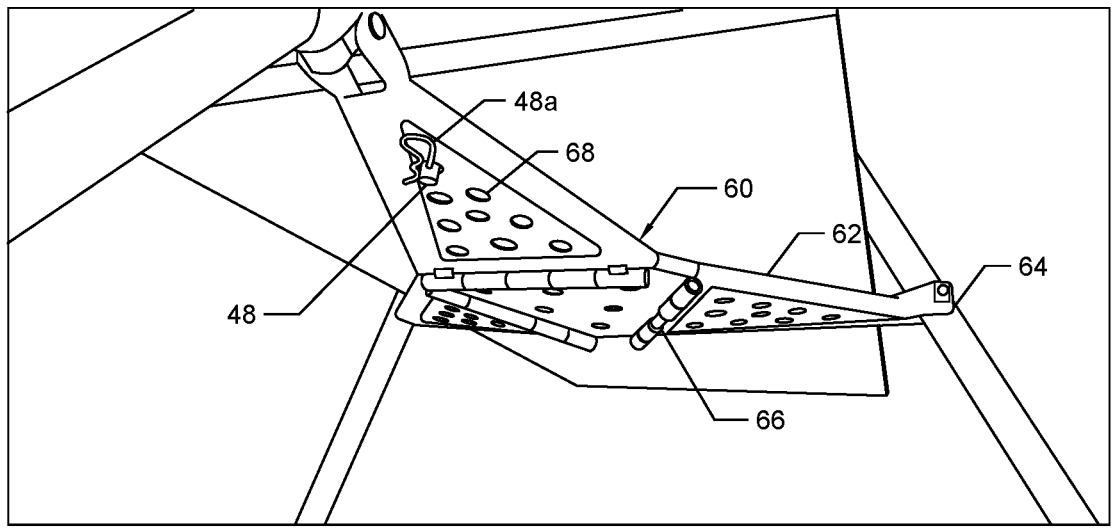
FIG. 4 illustrates an enlarged bottom perspective view of the holder assembly 60 having the securing element 48 of the drip pan assembly 40 inserted in one of the openings 64 of the holder assembly 60.

The drip assembly 40 may further include holders 46. The holders 46 may be installed in layer 42 to help in holding predetermined tools. The holders 46 may vary in shape and function. In one embodiment shown in FIG. 2 the holders 46 may have a bottom portion and a top portion. The bottom portion of the holders 46 may have a substantially cylindrical elongated shape. The top portion of the holders 46 may have a half-ring shape.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A suspended oil drip pan for a tool, comprising:
   a support assembly, wherein said support assembly includes a support stand for tools, said support stand is portable;
   a drip pan assembly, wherein said drip pan assembly includes a pan, said pan has securing elements; and
   a holder assembly, wherein said holder assembly includes a holding element, the holding element is attached to a central portion of said support stand, said pan is secured to said holding element by means of said securing elements, said pan is configured to support the weight of an oiler and prevent drip of oil; wherein said holding element is retractile, said holding element includes openings: wherein said securing elements are beneath said pan, said securing elements are inserted in said openings to prevent movement of said pan.

2. The suspended oil drip pan set forth in claim 1, wherein said support stand includes legs, said legs support the weight of said support stand.

3. The suspended oil drip pan set forth in claim 2, wherein said legs are rotatably attached to said support stand, said legs concentrically move towards said center portion.

4. The suspended oil drip pan set forth in claim 1, wherein said pan includes a side retainer, said side retainer extends perpendicularly up from the edges of said pan.

5. The suspended oil drip pan set forth in claim 1, wherein said pan includes holders, said holders extend perpendicularly up from said pan, said holders are adapted to attach predetermined tools thereto.

6. The suspended oil drip pan set forth in claim 1, wherein clips are inserted through said securing elements to fix said securing elements in said holding element.

7. A suspended oil drip pan for a tool, consisting of:
   a support assembly, wherein said support assembly includes a support stand for tools and legs, said legs are rotatably attached to said support stand, said legs concentrically move towards a central portion beneath said support stand, said support stand is portable;
   a drip pan assembly, wherein said drip pan assembly includes a pan, said pan has securing elements, holders, and a side retainer, said retainer extends perpendicularly up from the edges of said pan, said retainer is configured to prevent liquids from spilling from said pan, said holders extend perpendicularly up from a top portion of said pan, said holders are adapted to attach predetermined tools thereto, said securing elements are beneath said pan; and
   a holder assembly, wherein said holder assembly includes a holding element, the holding element is attached to said central portion of said support stand, said holding element is retractile, said holding element has openings, said pan is secured to said holding element by inserting said securing elements into said openings, wherein clips can be inserted through said securing elements to prevent the securing element of going out of said openings, said pan is configured to support the weight of an oiler and prevent drip of oil from said support stand to the floor.

* * * * *